(12) United States Patent
Tani (10) Patent No.: US 6,480,343 B2
(45) Date of Patent: Nov. 12, 2002

(54) DIOPTER ADJUSTING DEVICE

(75) Inventor: Tetsuro Tani, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/880,965

(22) Filed: Jun. 15, 2001

(65) Prior Publication Data

US 2001/0053031 A1 Dec. 20, 2001

(30) Foreign Application Priority Data

Jun. 16, 2000 (JP) .................................... 2000-181385

(51) Int. Cl.[7] .............................................. G02B 15/14
(52) U.S. Cl. ...................................................... 359/699
(58) Field of Search ................................ 359/699, 700, 359/701

(56) References Cited

U.S. PATENT DOCUMENTS

| | | | |
|---|---|---|---|
| 5,345,287 A | * 9/1994 | Taguchi | 359/705 |
| 6,006,038 A | 12/1999 | Kosako | 396/29 |
| 6,412,958 B2 | * 7/2002 | Aikawa | 359/407 |

FOREIGN PATENT DOCUMENTS

| | | | | |
|---|---|---|---|---|
| JP | 360233607 A | * 11/1985 | .................. | 359/823 |
| JP | 407327915 A | * 12/1995 | ............. | A61B/1/00 |
| JP | 2002072292 A | * 3/2002 | ............ | G03B/13/02 |

* cited by examiner

*Primary Examiner*—Ricky Mack
(74) *Attorney, Agent, or Firm*—Greenblum & Bernstein, P.L.C.

(57) ABSTRACT

A diopter adjusting device includes a diopter adjusting lens which is guided in an optical axis thereof; a cam member which is provided rotatable about an axis which is parallel to the optical axis of the diopter adjusting lens, the cam member being provided with a cam surface on an end surface thereof; a motion-transmission lever which is rotatable about a lever axis, the lever axis being positioned between the diopter adjusting lens and the motion-transmission lever and lying on a plane normal to the optical axis; a cam follower portion and an engaging portion formed on one and the other ends of the motion-transmission lever to be engaged with the cam surface and the diopter adjusting lens, respectively; and a spring for constantly bringing the cam follower portion into contact with the cam surface.

8 Claims, 10 Drawing Sheets

DIOPTER ADJUSTING DEVICE

BACKGROUND OF THE INVENTION

1. Field of the Invention

The present invention relates to a diopter adjusting device which can be incorporated in a viewfinder of a camera to allow the user to match the viewfinder image to his/her eyesight.

2. Description of the Related Art

Various types of diopter adjusting devices which can be incorporated in a viewfinder of a camera has been proposed. There have been demands for such diopter adjusting devices which are much smaller than conventional ones and which can be easily assembled with a small number of components.

SUMMARY OF THE INVENTION

An object of the present invention is to provide a simple and compact diopter adjusting device.

To achieve the objects mentioned above, according to an aspect of the present invention, a diopter adjusting device is provided, including a diopter adjusting lens which is guided in an optical axis thereof; a cam member which is provided rotatable about an axis which is parallel to the optical axis of the diopter adjusting lens, the cam member being provided with a cam surface on an end surface thereof; a motion-transmission lever which is rotatable about a lever axis, the lever axis being positioned between the diopter adjusting lens and the motion-transmission lever and lying on a plane normal to the optical axis; a cam follower portion and an engaging portion formed on one and the other ends of the motion-transmission lever to be engaged with the cam surface and the diopter adjusting lens, respectively; and a spring for constantly bringing the cam follower portion into contact with the cam surface.

Preferably, the spring is a torsion spring having a coil spring portion, the coil spring portion being positioned about the axis of the motion-transmission lever.

Preferably, the motion-transmission lever includes a rocking lever portion having the cam follower portion and the engaging portion, a rotational center portion which extends from a middle portion of the rocking lever portion in a direction parallel to the lever axis, and first and second connecting portions, formed at one and the other ends of the rotational center portion, to be pivoted about the lever axis, respectively.

Preferably, the diopter adjusting lens includes a follower pin which projects in a direction perpendicular to the optical axis of the diopter adjusting lens, wherein the engaging portion of the motion-transmission lever holds the follower pin. Preferably, the engaging portion is bifurcated.

Preferably, a distance from the lever axis to the engaging portion is longer than a distance from the lever axis to the cam follower portion.

Preferably, the diopter adjusting device further includes a lens guide frame in which the diopter adjusting lens is positioned. The diopter adjusting lens includes a plurality of parallel guide legs which extend parallel to each other in a direction of the optical axis of the diopter adjusting lens. The lens guide frame includes a corresponding plurality of linear guide slots in which the plurality of parallel guide legs are respectively engaged to be slidable in the direction of the optical axis of the diopter adjusting lens. Preferably, the follower pin projects from one of the plurality of parallel guide legs.

According to another aspect of the present invention, a viewfinder is provided having a diopter adjusting device. The diopter adjusting device includes a diopter adjusting lens guided along an optical axis thereof, and serving as a rearmost lens element of an eyepiece optical system of the viewfinder; a cam member which is rotatable about an axis parallel to the optical axis of the diopter adjusting lens, the cam member including a cam surface; a motion-transmission lever which is rotatable about a lever axis, the motion-transmission lever being associated with the diopter adjusting lens and the cam member to transmit motion of the cam member to the diopter adjusting lens, wherein the lever axis is positioned between the diopter adjusting lens and the motion-transmission lever and lies on a plane extending perpendicular to the optical axis; a cam follower portion formed on an end of the motion-transmission lever to be engaged with the cam surface; an engaging portion formed on the other end of the motion-transmission lever to be engaged with the diopter adjusting lens; and a spring for constantly bringing the cam follower portion into contact with the cam surface.

The present disclosure relates to subject matter contained in Japanese Patent Application No.2000-181385 (filed on Jun. 16, 2000) is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
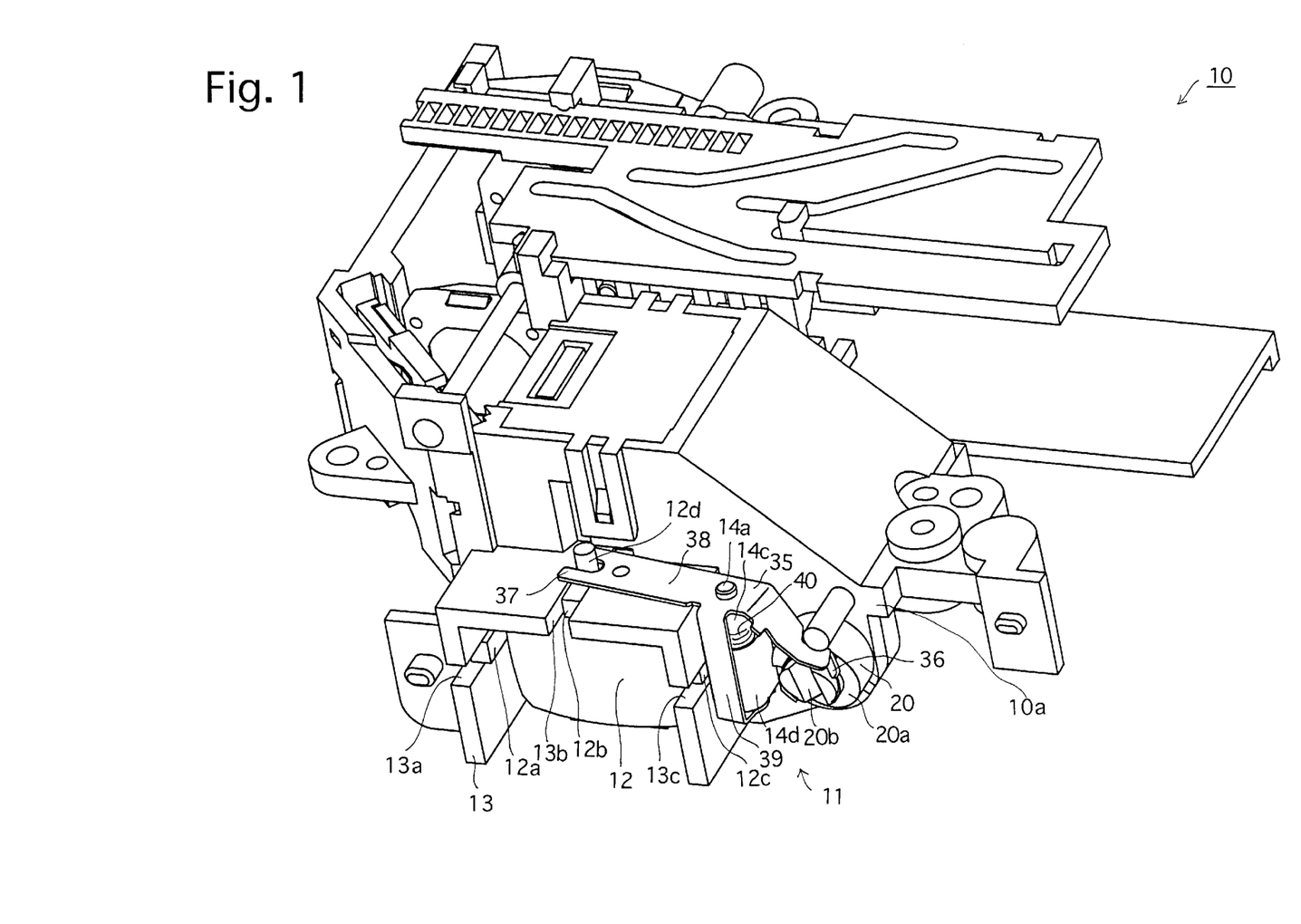
FIG. 1 is a perspective view of a viewfinder system having an embodiment of a diopter adjusting device to which the present invention is applied, viewed from the diopter adjusting lens side.
Figure 2:
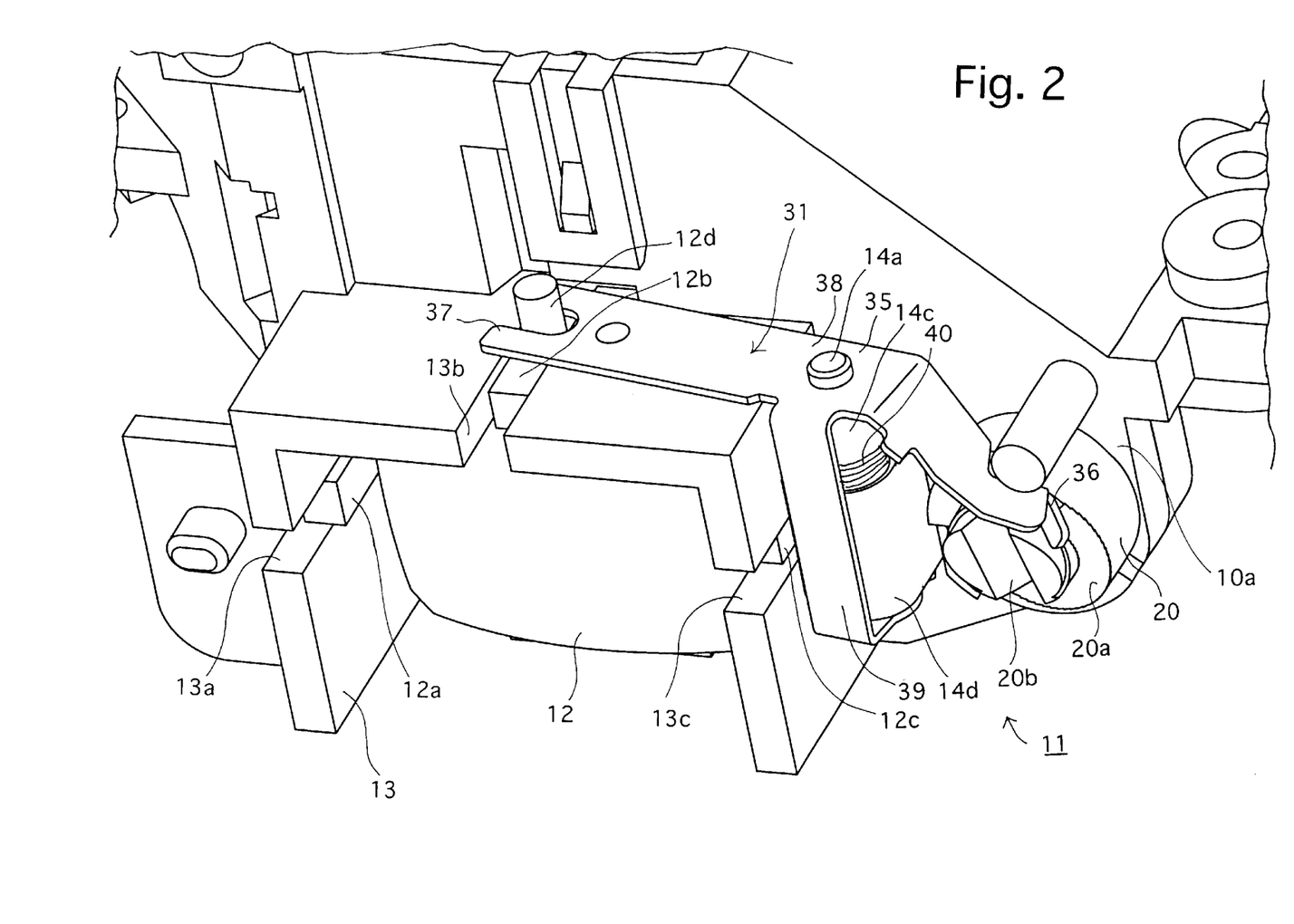
FIG. 2 is an enlarged perspective view of the diopter adjusting device shown in FIG. 1.
Figure 3:
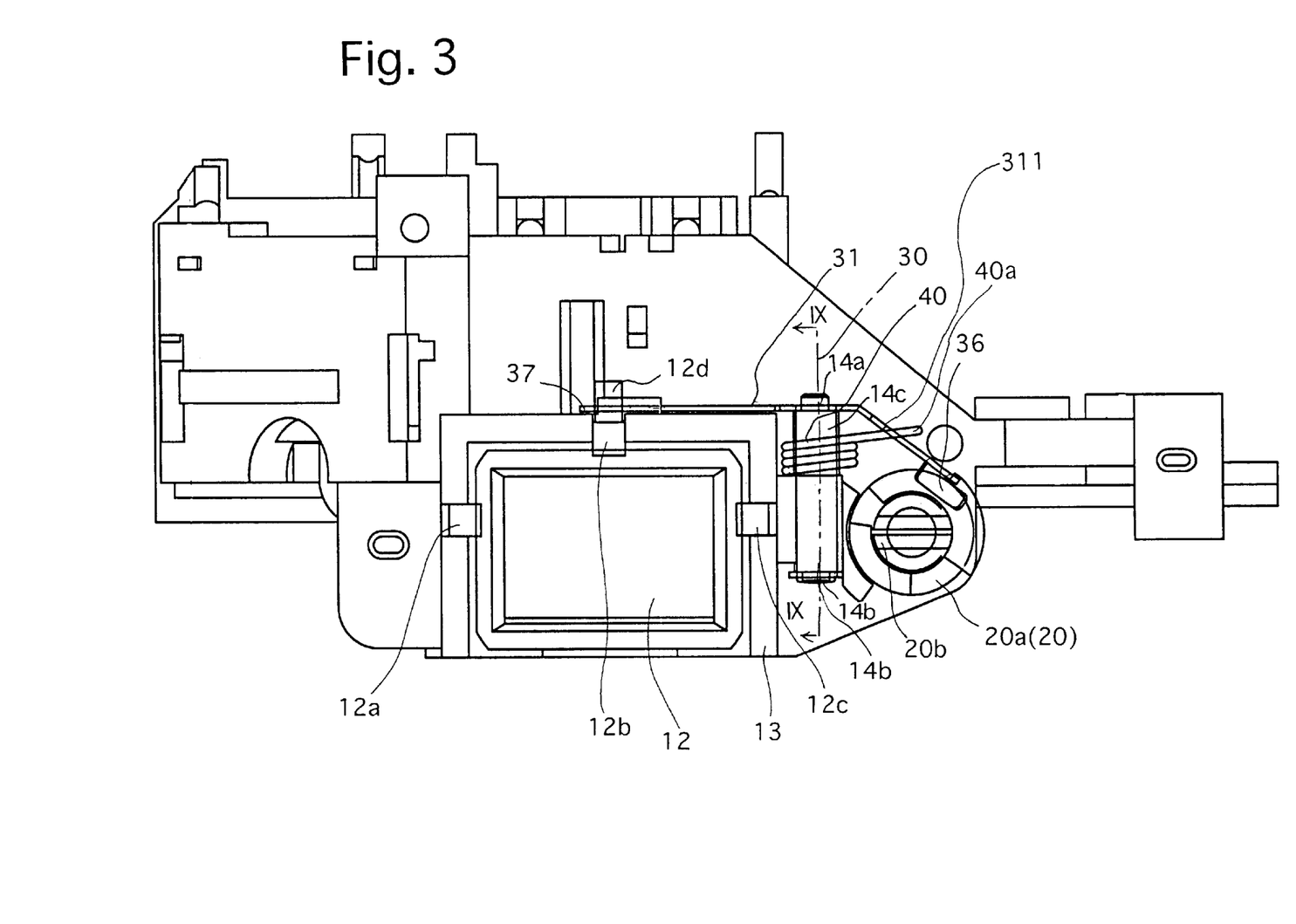
FIG. 3 is a front elevational view of the viewfinder system shown in FIG. 1, viewed from the diopter adjusting lens side.

FIGS. 1 through 3 show a viewfinder system (viewfinder) 10 having an embodiment of a diopter adjusting device 11 to which the present invention is applied. The viewfinder system 10 is incorporated in a camera (not shown), e.g., a conventional compact camera using sensitive film, or a digital camera. The viewfinder system 10 is provided with a viewfinder optical system including an objective optical system, an erecting system and an eyepiece optical system, in that order from the object side. An inverted image (real image) is converted into an erect image via the erecting system to be viewed through the eyepiece optical system. The eyepiece optical system includes a diopter adjusting lens 12, which is a rearmost lens element among all the lens elements of the eyepiece optical system which is closest to the eye of the user. The diopter adjusting lens 12 is moved in a direction of the optical axis thereof by the diopter adjusting device 11 to allow the user to match the viewfinder image to his/her eyesight.

Figures 4, 5:
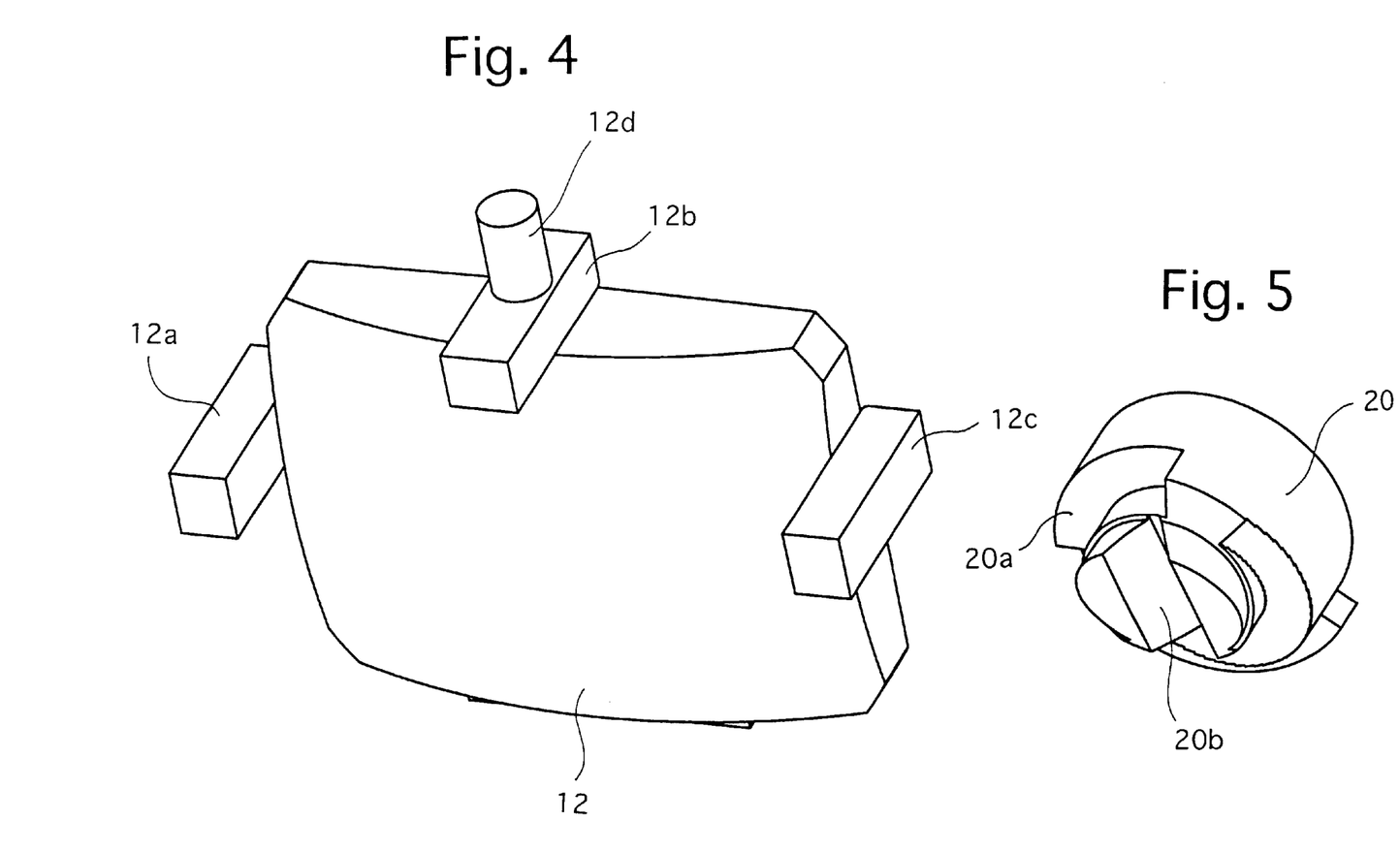
FIG. 4 is a perspective view of the diopter adjusting lens.
FIG. 5 is a cam member for moving the diopter adjusting lens.
Figure 6:
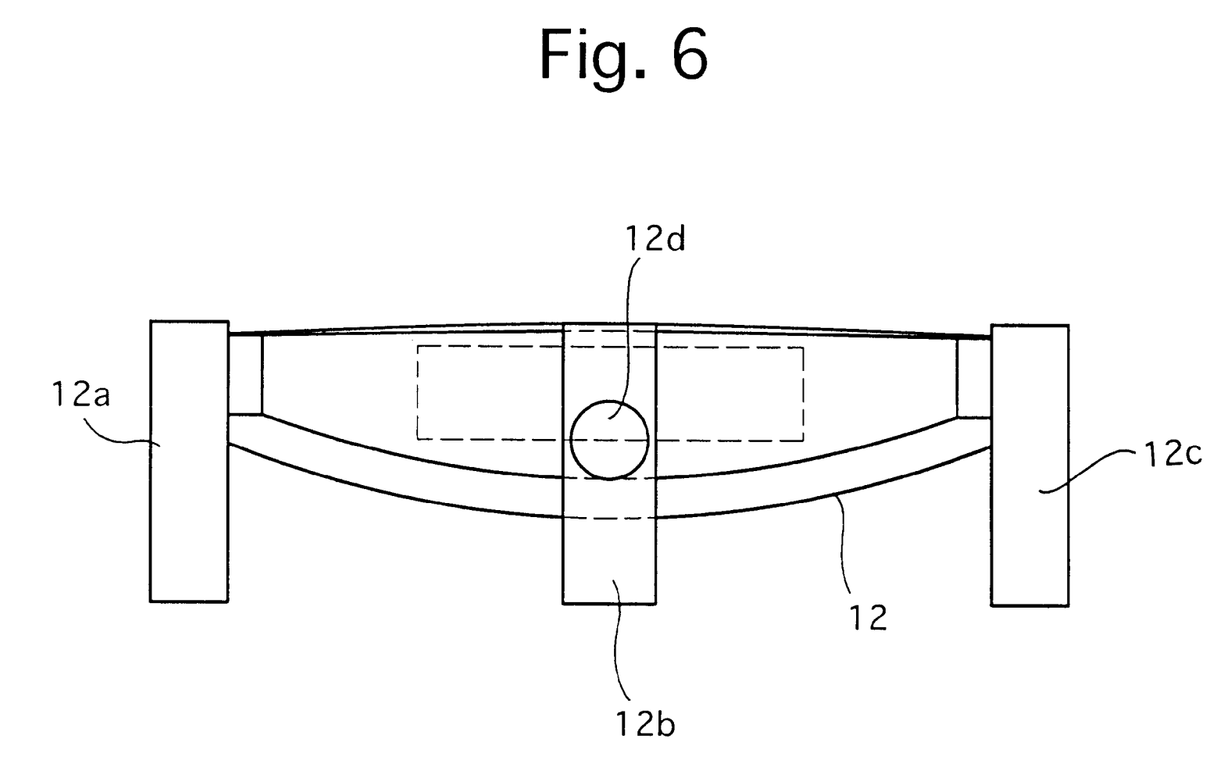
FIG. 6 is a plan view of the diopter adjusting lens.

As shown in FIGS. 4 and 6, the diopter adjusting lens 12 is provided with three parallel guide legs 12a, 12b and 12c which extend parallel to each other in the direction of the optical axis of the diopter adjusting lens 12. The three guide legs 12a, 12b and 12c are formed integral with the diopter adjusting lens 12. The viewfinder system 10 is provided with a lens guide frame 13 in which the diopter adjusting lens 12 is positioned. The lens guide frame 13 is provided with three parallel linear guide slots 13a, 13b and 13c in which the three guide legs 12a, 12b and 12c of the diopter adjusting lens 12 are respectively fitted to be slidable in the direction of the optical axis thereof. A follower pin 12d projects upwards from top of the upper-middle guide leg 12b.

The diopter adjusting device 11 is provided on one side (right side as viewed in FIG. 3) of the diopter adjusting lens 12 with a rotatable cam member 20. The rotatable cam member 20 is provided on an end face thereof with a cam surface 20a. The rotatable cam member 20 is supported by a frame 10a of the viewfinder system 10 to be rotatable about an axis extending parallel to the optical axis of the diopter adjusting device 11. The rotatable cam member 20 is provided at a rotational center thereof with an asymmetrical recess 20b in which a projection (not shown) having a corresponding shape which is formed on a diopter adjusting knob (not shown) provided on a camera body is engaged. The diopter adjusting lens 12 is moved by the rotation of the rotatable cam member 20 via the manual turning of the diopter adjusting knob so as to adjust the diopter of the viewfinder image with respect to the user's eyesight.

Figure 11:
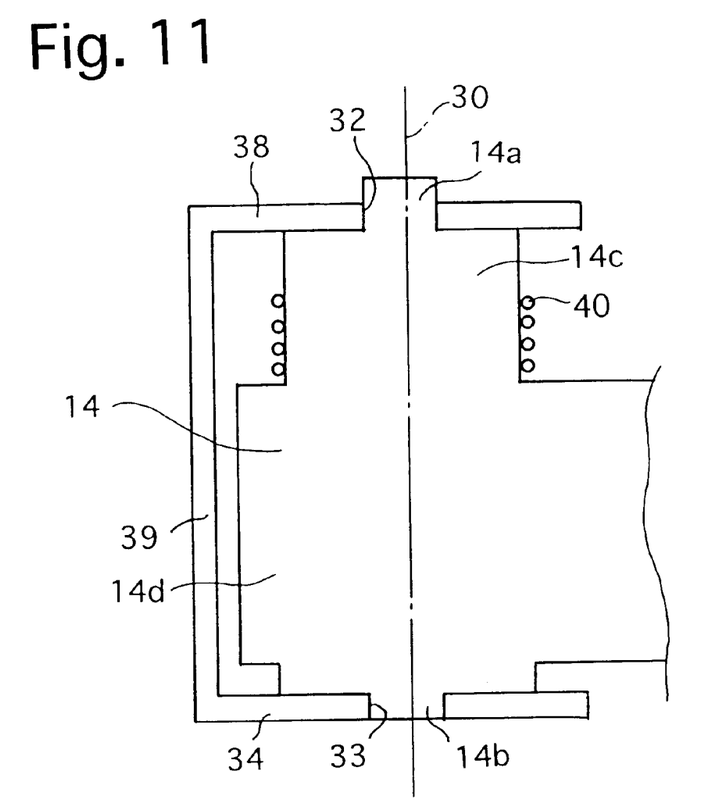
FIG. 11 is a cross sectional view of the diopter adjusting device, taken along IX—IX line, viewed in the direction of the appended arrows.

The diopter adjusting device 11 is provided with a motion-transmission lever 31 which extends between the diopter adjusting lens 12 and the rotatable cam member 20. The diopter adjusting device 11 is provided, on one side (right side as viewed in FIG. 3) of the lens guide frame 13 between the diopter adjusting lens 12 and the rotatable cam member 20, with a lever support portion 14 which is formed integral with the lens guide frame 13. As shown in FIG. 11, the lever support portion 14 is provided with a base portion 14d and a cylinder portion 14c formed on top of the base portion 14d. The lever support portion 14 is provided on top of the cylinder portion 14c with an upper projection 14a, and is further provided on bottom of the base portion 14d with a lower projection 14b. The upper and lower projections 14a and 14d are coaxially positioned on a lever axis 30 of rotation of the motion-transmission lever 31. The lever axis 30 lies on a plane extending perpendicular to the optical axis of the diopter adjusting lens 12.

Figure 7:
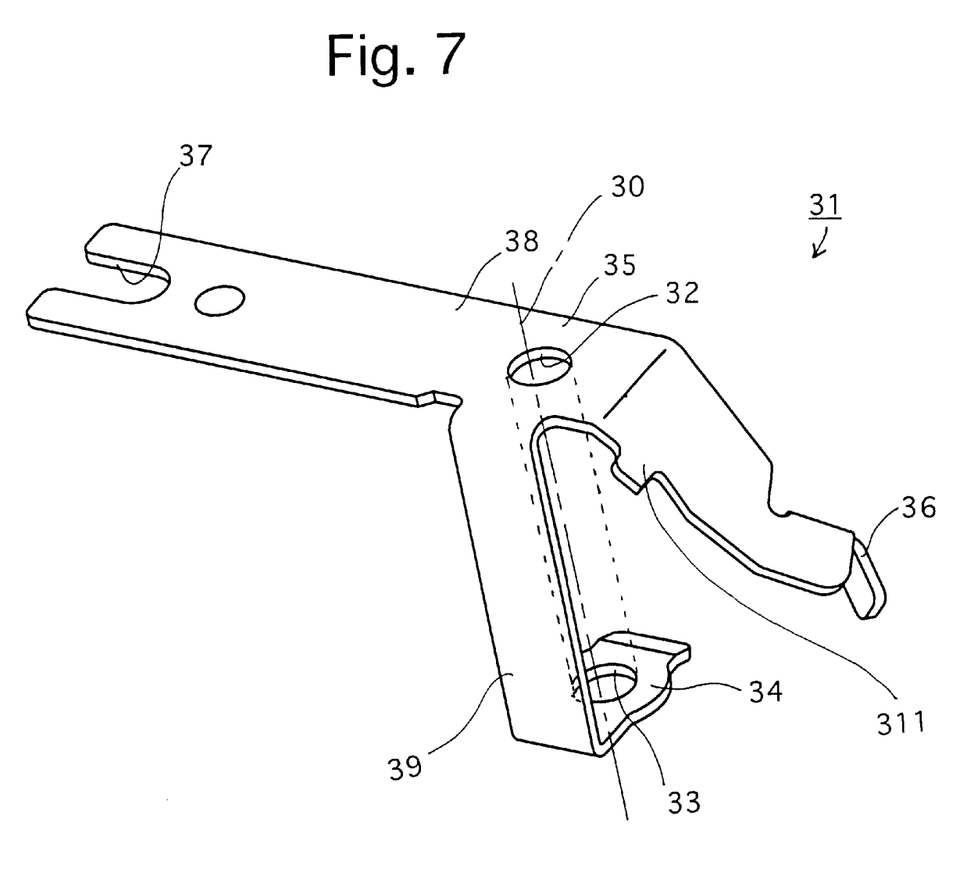
FIG. 7 is a perspective view of a motion-transmission lever.
Figure 8:
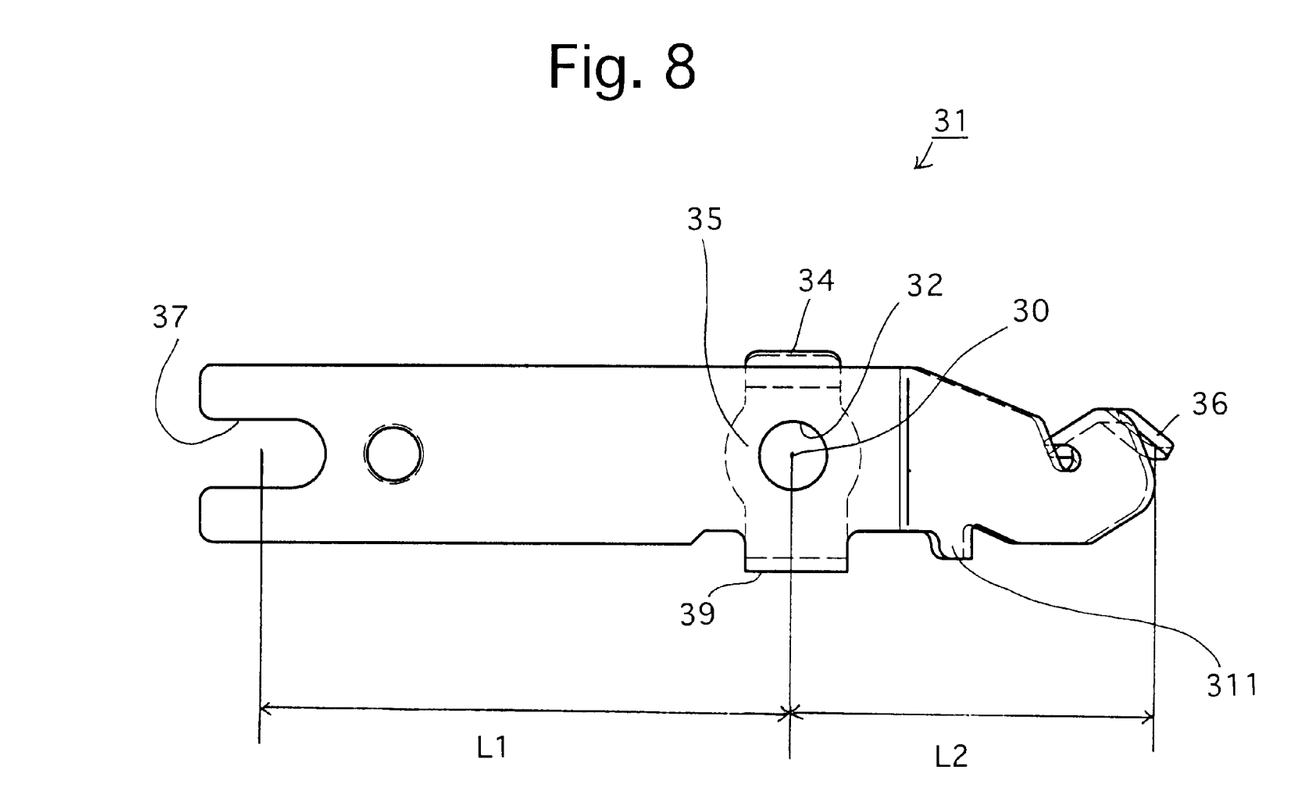
FIG. 8 is a plan view of the motion-transmission lever.

As shown in FIGS. 7 and 8, the motion-transmission lever 31 is provided with a rotational center portion 39 which extends parallel to the lever axis 30, and a rocking lever portion 38 which extends perpendicular to the rotational center portion 39. The rocking lever portion 38 is provided at one end (right end as shown in FIG. 7) thereof with a cam follower portion 36 which comes in sliding contact with the cam surface 20a of the rotatable cam member 20. The rocking lever portion 38 is provided at the other end (left end as shown in FIG. 7) thereof with a bifurcated portion (engaging portion) 37 which slidably holds the follower pin 12d. The motion-transmission lever 31 is provided at upper and lower ends of the rotational center portion 39 with upper and lower connecting portions 35 and 34 which have upper and lower coaxial through holes 32 and 33, respectively. Part of the rocking lever portion 38 is formed as the upper connecting portion 35. The upper and lower projections 14a and 14b of the lever support portion 14 are fitted in the upper and lower coaxial through holes 32 and 33, respectively, so that the motion-transmission lever 31 can rotate about the lever axis 30 relative to the lever support portion 14. The motion-transmission lever 31 is made of metal, and the upper and lower connecting portions 35 and 34 of the motion-transmission lever 31 elastically hold the lever support portion 14 from the upper and lower sides thereof so that the motion-transmission lever 31 does not move in the direction of the lever axis 30 relative to the lever support portion 14.

As can be seen in FIG. 8, the motion-transmission lever 31 is designed so that a distance L1 from the rotational center portion 39 (or the lever axis 30) to the bifurcated portion 37 is longer than a distance L2 from the rotational center portion 39 (or the lever axis 30) to the cam follower portion 36. Therefore, the ratio of the distance L1 to the distance L2 is determined so that the displacement of a contacting point on the cam surface 20a with the cam follower portion 36 in the direction of the axis of the rotatable cam member 20 is transmitted to the diopter adjusting lens 12 so that the diopter adjusting lens 12 is moved by a larger amount of displacement.

Figure 9:
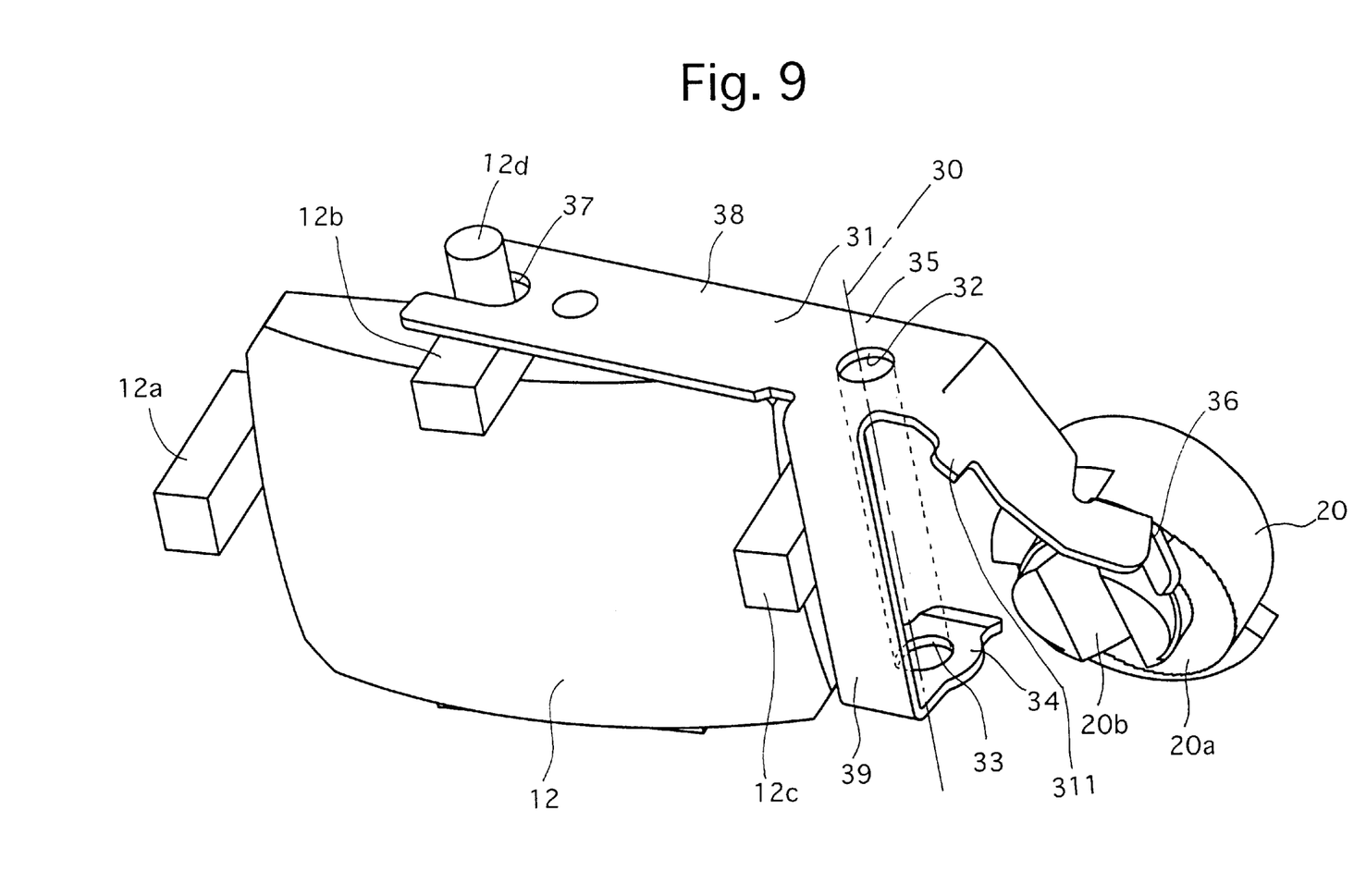
FIG. 9 is a perspective view of the diopter adjusting lens, the cam member and the motion-transmission lever, showing a state where one end and another end of the motion-transmission lever are engaged with the diopter adjusting lens and the cam member, respectively.
Figure 10:
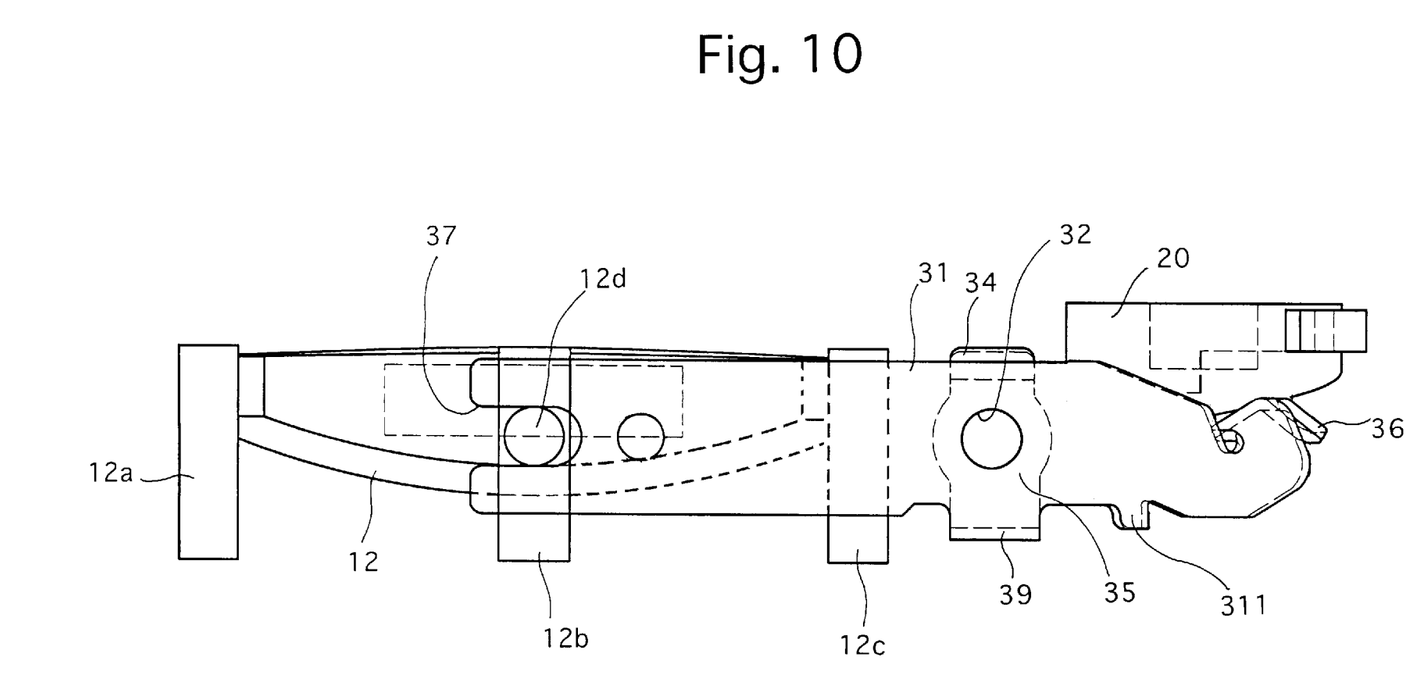
FIG. 10 is a top view of the diopter adjusting lens, the cam member and the motion-transmission lever which are shown in FIG. 9.

The diopter adjusting device 11 is provided between the diopter adjusting lens 12 and the rotatable cam member 20 with a torsion spring 40. A coil spring portion of the torsion spring 40 is fitted on the cylinder portion 14c of the lever support portion 14. An arm member 40a which is provided on one end portion of the torsion spring 40 engages with a spring lock-engaging pawl 311 which is formed on the motion-transmission lever 31 (shown best in FIGS. 7 or 9). The other arm member (not shown) of the torsion spring 40 is engaged with the frame 10a of the view finder system 10 at a predetermined position. The motion-transmission lever 31 is constantly biased to rotate in a direction to bring the cam follower portion 36 into pressing contact with the cam surface 20a of the rotatable cam member 20.

In the present embodiment of the diopter adjusting device 11 having the above described structure, the diopter adjusting lens 12 is moved by manually turning the diopter adjusting knob (not shown) so as to match the viewfinder image to his/her eyesight. Forward or reverse rotation of the rotatable cam member 20 causes a contacting point on the cam surface 20a with the cam follower portion 36 to vary, which in turn causes the cam follower portion 36 to move forward or rearward in the direction of the axis thereof. This forward or rearward movement of the cam follower portion 36 causes the motion-transmission lever 31 to rotate forward or reverse about the lever axis 30 thereof, which moves the diopter adjusting lens 12 forward or rearward in the direction of the optical axis thereof via the bifurcated portion 37 and the follower pin 12d. At this time, the diopter adjusting lens 12 moves by a greater amount of movement than the cam follower portion 36 since the distance L1 from the rotational center portion 39 (or the lever axis 30) to the bifurcated portion 37 is determined longer than the distance L2 from the rotational center portion 39 (or the lever axis 30)

to the cam follower portion 36 as mentioned above. Therefore, providing the inclination angle of the cam surface 20a is constant, the diopter adjusting lens 12 can be moved by a relatively large amount by rotating the cam member 20 by a small amount. Similarly, providing the rotational angle of the cam member 20 is constant, the diopter adjusting lens 20 can be moved by a relatively large amount even if the inclination angle of the cam surface 20a is small. Consequently, the amount of movement of the cam follower portion 36 that is necessary for moving the diopter adjusting lens 12 can be decreased in order to reduce the size of the diopter adjusting device 11. The ratio of the distance L1 to the distance L2 of the motion-transmission lever 31 can be freely determined with consideration given to the operability and the sensitivity of the diopter adjusting knob, which is coupled to the asymmetrical recess 20b of the cam member 20.

Although the above described embodiment of the diopter adjusting device 11 is incorporated in a viewfinder system of a camera, the diopter adjusting device can be incorporated in a viewfinder of any other optical instrument.

As can be understood from the foregoing, according to the present invention, a simple and compact diopter adjusting device is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A diopter adjusting device comprising:
   a diopter adjusting lens which is guided in an optical axis thereof;
   a cam member which is provided rotatable about an axis parallel to said optical axis of said diopter adjusting lens, said cam member being provided with a cam surface on an end surface thereof;
   a motion-transmission lever which is rotatable about a lever axis, said lever axis being positioned between said diopter adjusting lens and said motion-transmission lever and lying on a plane normal to said optical axis;
   a cam follower portion and an engaging portion formed on one and the other ends of said motion-transmission lever to be engaged with said cam surface and said diopter adjusting lens, respectively; and
   a spring for constantly bringing said cam follower portion into contact with said cam surface.

2. The diopter adjusting device according to claim 1, wherein said spring comprises a torsion spring having a coil spring portion, said coil spring portion being positioned about said axis of said motion-transmission lever.

3. The diopter adjusting device according to claim 1, wherein said motion-transmission lever comprises:
   a rocking lever portion having said cam follower portion and said engaging portion;
   a rotational center portion which extends from a middle portion of said rocking lever portion in a direction parallel to said lever axis; and
   first and second connecting portions, formed at one and the other ends of said rotational center portion, to be pivoted about said lever axis, respectively.

4. The diopter adjusting device according to claim 1, wherein said diopter adjusting lens comprises a follower pin which projects in a direction perpendicular to said optical axis of said diopter adjusting lens, and
   wherein said engaging portion of said motion-transmission lever holds said follower pin.

5. The diopter adjusting device according to claim 4, wherein said engaging portion is bifurcated.

6. The diopter adjusting device according to claim 1, wherein a distance from said lever axis to said engaging portion is longer than a distance from said lever axis to said cam follower portion.

7. The diopter adjusting device according to claim 4, further comprising a lens guide frame in which said diopter adjusting lens is positioned;
   wherein said diopter adjusting lens comprises a plurality of parallel guide legs which extend parallel to each other in a direction of said optical axis of said diopter adjusting lens;
   wherein said lens guide frame comprises a corresponding plurality of linear guide slots in which said plurality of parallel guide legs are respectively engaged to be slidable in said direction of said optical axis of said diopter adjusting lens; and
   wherein said follower pin projects from one of said plurality of parallel guide legs.

8. A viewfinder having a diopter adjusting device comprising:
   a diopter adjusting lens guided along an optical axis thereof, and serving as a rearmost lens element of an eyepiece optical system of said viewfinder;
   a cam member which is rotatable about an axis parallel to said optical axis of said diopter adjusting lens, said cam member comprising a cam surface;
   a motion-transmission lever which is rotatable about a lever axis, said motion-transmission lever being associated with said diopter adjusting lens and said cam member to transmit motion of said cam member to said diopter adjusting lens, wherein said lever axis is positioned between said diopter adjusting lens and said motion-transmission lever and lies on a plane extending perpendicular to said optical axis;
   a cam follower portion formed on an end of said motion-transmission lever to be engaged with said cam surface;
   an engaging portion formed on the other end of said motion-transmission lever to be engaged with said diopter adjusting lens; and
   a spring for constantly bringing said cam follower portion into contact with said cam surface.

* * * * *